US009399170B2

(12) United States Patent
Cook et al.

(10) Patent No.: US 9,399,170 B2
(45) Date of Patent: Jul. 26, 2016

(54) SYSTEMS, METHODS, AND COMPUTER PROGRAM PRODUCTS FOR OBJECTIVE FANTASY SPORTING CONTESTS

(71) Applicants: Daniel Olin Cook, Washington, DC (US); Sean Paul Murphy, Arlington, VA (US)

(72) Inventors: Daniel Olin Cook, Washington, DC (US); Sean Paul Murphy, Arlington, VA (US)

(73) Assignee: FANAMANA, INC., Washington, DC (US)

( * ) Notice: Subject to any disclaimer, the term of this patent is extended or adjusted under 35 U.S.C. 154(b) by 239 days.

(21) Appl. No.: 14/156,192

(22) Filed: Jan. 15, 2014

(65) Prior Publication Data

US 2014/0200076 A1    Jul. 17, 2014

Related U.S. Application Data

(60) Provisional application No. 61/752,769, filed on Jan. 15, 2013.

(51) Int. Cl.
| | | |
|---|---|---|
| *G06F 17/00* | (2006.01) | |
| *A63F 13/30* | (2014.01) | |
| *A63F 13/00* | (2014.01) | |
| *A63F 13/65* | (2014.01) | |
| *A63F 13/92* | (2014.01) | |
| *A63F 13/828* | (2014.01) | |

(52) U.S. Cl.
CPC .............. *A63F 13/12* (2013.01); *A63F 13/005* (2013.01); *A63F 13/65* (2014.09); *A63F 13/828* (2014.09); *A63F 13/92* (2014.09)

(58) Field of Classification Search
USPC ...................................... 463/9, 30–32, 40, 42
See application file for complete search history.

(56) References Cited

U.S. PATENT DOCUMENTS

| | | | | |
|---|---|---|---|---|
| 5,860,862 | A | 1/1999 | Junkin | |
| 8,357,044 | B2 * | 1/2013 | Ng | A63F 13/12 463/1 |
| 8,369,970 | B2 * | 2/2013 | Allen | A63F 13/12 463/42 |
| 8,388,445 | B2 * | 3/2013 | Pavlich | A63F 13/12 463/40 |
| 8,851,998 | B2 * | 10/2014 | Pawson | A63F 13/12 463/42 |
| 8,876,607 | B2 * | 11/2014 | Ng | G07F 17/32 463/4 |
| 2006/0252476 | A1 * | 11/2006 | Bahou | A63F 13/12 463/4 |
| 2009/0156312 | A1 * | 6/2009 | Ng | G07F 17/3237 463/42 |
| 2014/0200076 | A1 * | 7/2014 | Cook | A63F 13/005 463/31 |

\* cited by examiner

*Primary Examiner* — Ronald Laneau
(74) *Attorney, Agent, or Firm* — Rothwell, Figg, Ernst & Manbeck, P.C.

(57) ABSTRACT

The present invention is directed to systems, methods and computer program products for providing a fantasy sports game that shares the same objective as an actual sporting contest and that is played in real-time during the actual sporting contest. A method of the present invention comprises displaying an indication of an option to start the game and receiving an input indicating to start the game. The method includes displaying a list of players intended to participate in an actual event to occur in the actual sporting contest and receiving an input indicating a first selection of at least one of the players. The method includes receiving real-time data from the actual sporting contest including a first actual result for the first actual event. The method includes displaying an indication of the first actual result and determining a virtual result in the game based on the first actual result.

20 Claims, 16 Drawing Sheets

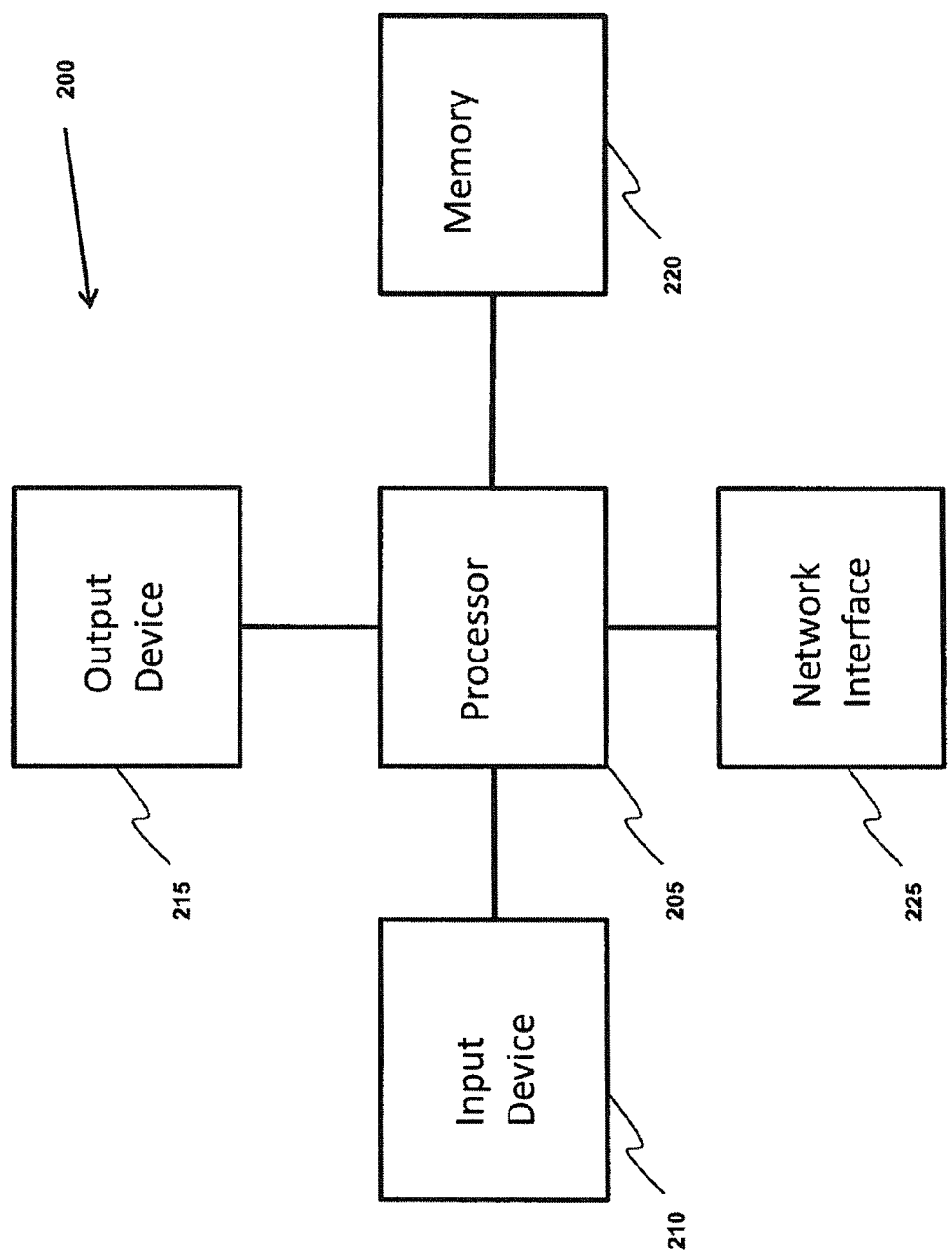
Fig. 2  Client/Device

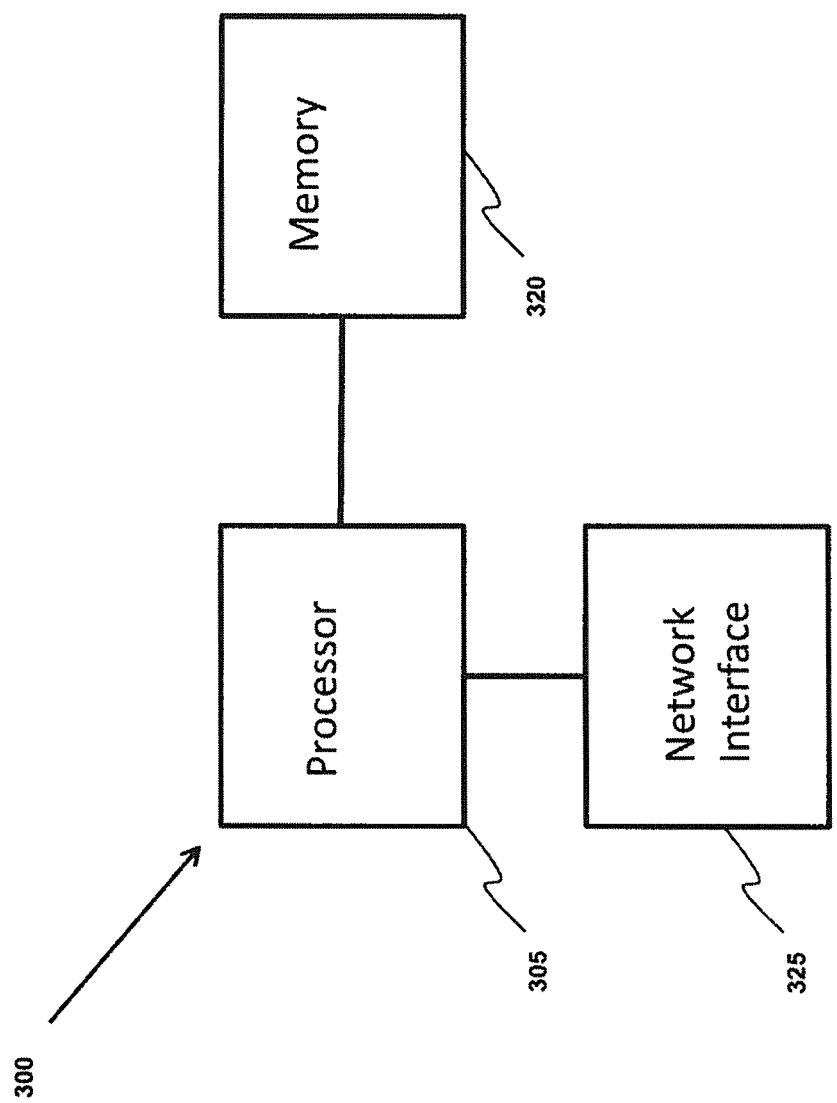

Home Screen

Game Screen: Start

Game Screen: Picks

Game Screen: Summary

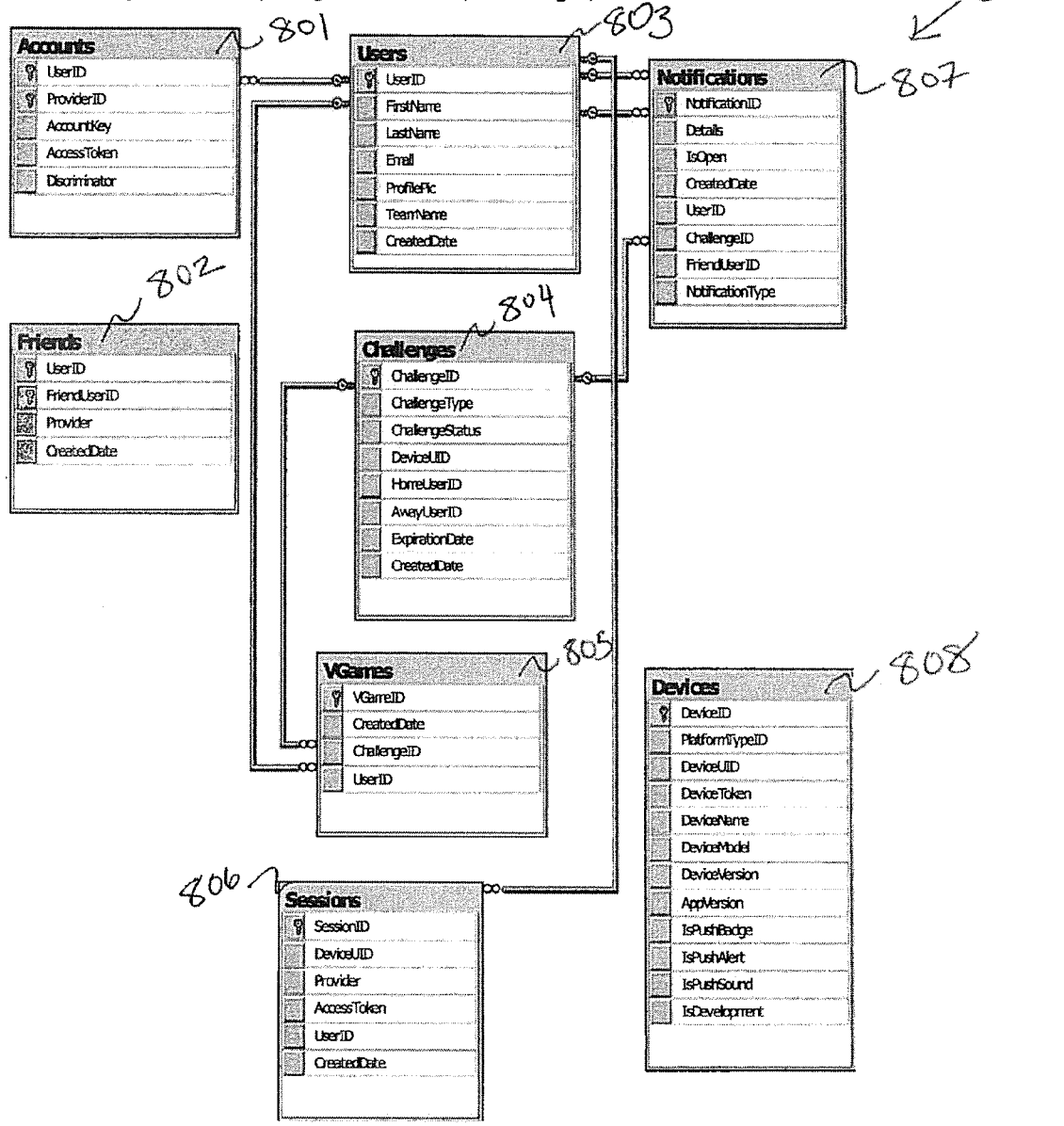
FIG 8 Entity Relationship Diagram 1.1 *Users, Challenges, Devices.*

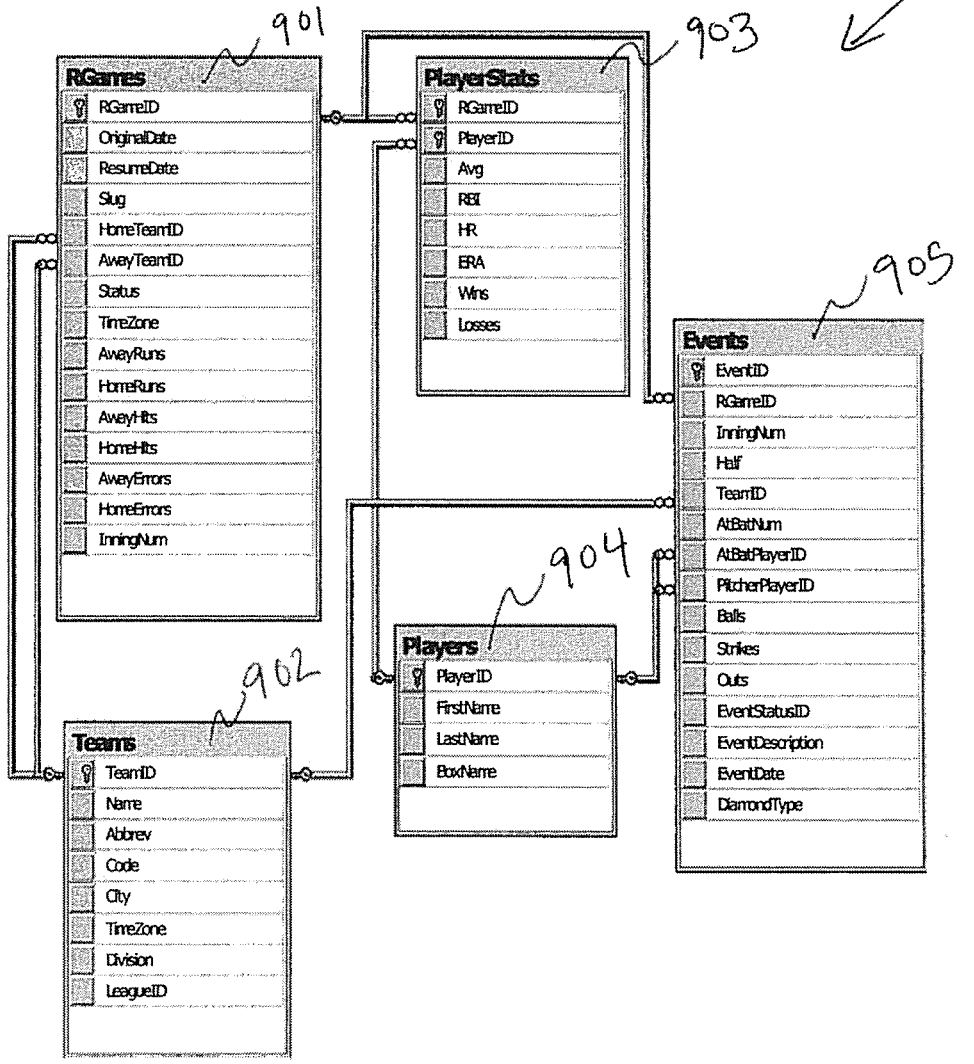
FIG 9 Entity Relationship Diagram 1.2 *Real Game Data*

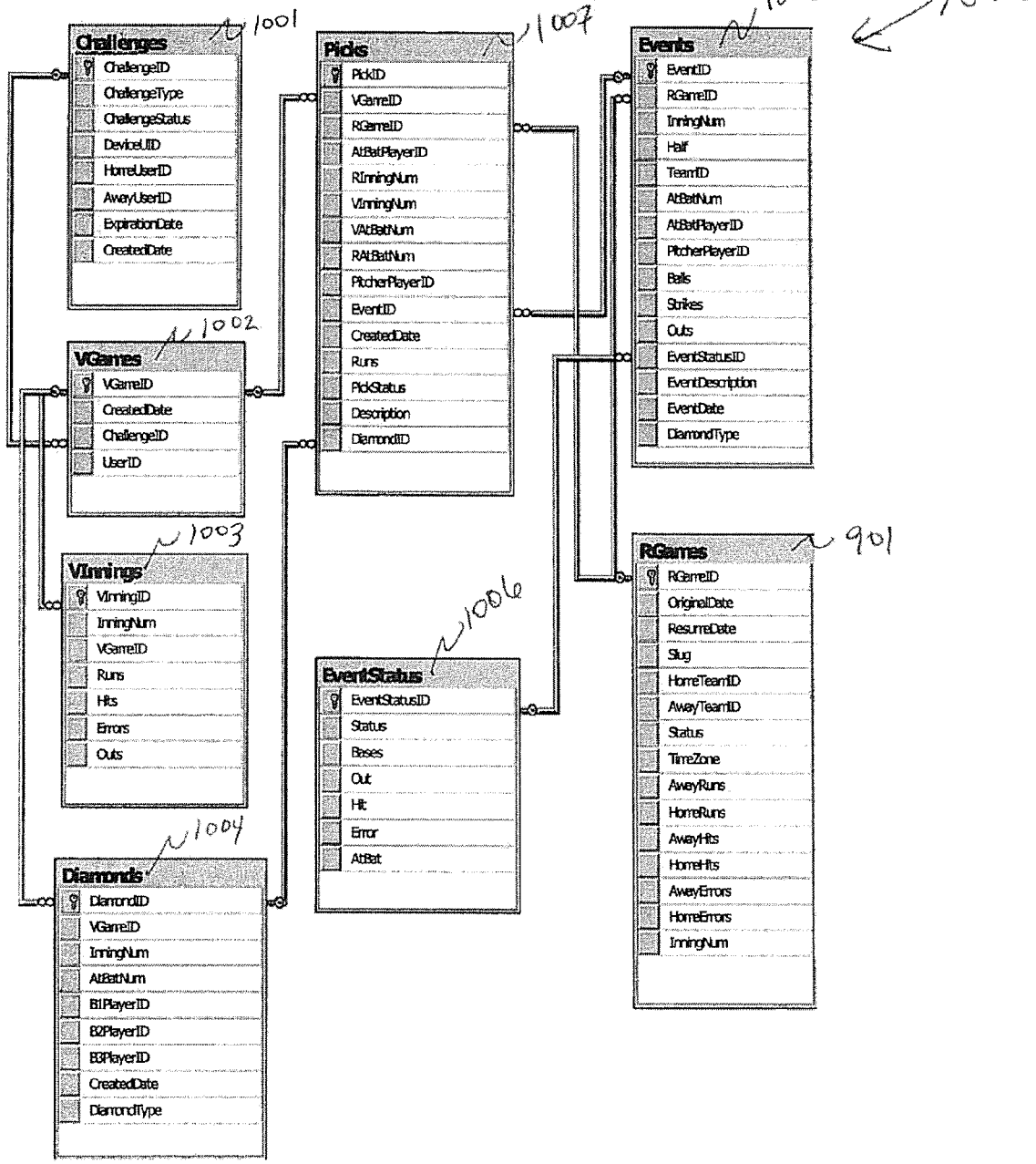
FIG 10 Entity Relationship Diagram 1.3 *Challenge / Game Infrastructure*

US 9,399,170 B2

SYSTEMS, METHODS, AND COMPUTER PROGRAM PRODUCTS FOR OBJECTIVE FANTASY SPORTING CONTESTS

CROSS REFERENCE TO RELATED APPLICATION

The present application claims priority benefit under 35 U.S.C. §119(e) of U.S. Provisional Application No. 61/752,769, filed on Jan. 15, 2013, the contents of which are incorporated herein by reference in its entirety.

TECHNICAL FIELD

The present invention relates generally to systems, methods, and non-transitory computer program products for enabling users to create and play fantasy sporting contests. More particularly, the present invention relates to fantasy sporting contests with objectives that are identical to the objectives of the actual sporting contests.

BACKGROUND

In traditional fantasy sports contests, competitors create a team by selecting players of professional or amateur sports leagues or associations to be on their fantasy team. A predetermined list of statistical categories is chosen as the basis of scoring of the fantasy sports contest. The statistics are compiled based on the results of actual sporting contest. Traditional fantasy sports contests, both rotisserie and head-to-head, are about accumulating more points than your opponent(s) in statistical categories.

While playing based on the accumulation of points in statistical categories offers one way to compete, the objective of this type of fantasy sports contest is quite different than the objective of an actual sporting contest.

In addition to the difference in objectives, traditional fantasy sports contests are a passive player experience. That is, the competitors typically draft their players in the beginning of the season and then set their roster before the start of the actual sporting contests. The passive nature of traditional fantasy sports games is in stark contrast with the action associated with participating in an actual sporting contest, with events and adjustments occurring in real-time during the course of the game.

There is a need in the fantasy sports gaming area for a system, method and computer program product that enables participants to play the fantasy sports game focused on the same objective as the actual game itself that the fantasy sporting contest is based on, rather than on predetermined stats. Moreover, there is a further need to enable participants to actively participate in the fantasy sporting contest during the actual sporting contest to add a further level of control and excitement not available in current fantasy sports games.

SUMMARY

The present invention provides for competitors to create and play a virtual sports contest that shares the same objective as the actual sporting contest. For example, if you are playing baseball, your objective is to score more runs than the opposing team. In soccer or hockey, the objective is to score more goals than the opposing teams. In football and basketball, the objective is to score more points than your opponent.

The present invention also provides users to be engaged in real time as the actual sporting events are happening by utilizing real time data of actual sporting events available through the internet. Users are given a series of events to choose from based on the status of the actual sporting contest. The outcome of the users' selected event is then used as an event in the virtual sporting contest. The virtual sporting contest will be created by compiling the outcome of the selected series of events from actual sporting events. The process of selecting events is repeated until either the virtual sporting contest is completed or all of the actual sporting contests have ended.

Particular embodiments of the present invention are directed to systems, methods, and computer program products for providing an objective fantasy sports game.

In one particular embodiment, a method for providing an objective fantasy sports game includes receiving a first user response including a selection of a sporting contest. The method further includes displaying a list of a plurality of events in one or more actual sporting contests. The method further includes receiving a second user response including a selection of one event of the plurality of events. The method further includes receiving a live stream comprising results for the plurality of events. The method further includes determining a result of the selected event in a virtual sporting contest based on a result of the user selected event.

In another embodiment, a device for providing an objective fantasy sports game includes a processor, a memory coupled to the processor, an input device coupled to the processor, and an output device coupled to the processor. The processor is configured to receive on the input device a first input including a selection of a sporting contest. The processor is further configured to display on an output device a list of a plurality of events in one or more actual sporting contests. The processor is further configured to receive on the input device a second input including a selection of one event of the plurality of events. The processor is further configured to receive and store in the memory coupled to the processor a live stream comprising results for the plurality of events. The processor is further configured to determine a result of the selected event in a virtual sporting contest based on a result of the user selected event.

In another embodiment, a non-transitory computer program product includes a computer readable medium storing computer readable program code embodied in the medium. The computer program product includes program code for causing a computing device to receive on the input device a first input including a selection of a sporting contest. The computer program product includes program code for causing an output device to display on an output device a list of a plurality of events in one or more actual sporting contests. The computer program product includes program code for causing a computing device to receive on the input device a second input including a selection of one event of the plurality of events. The computer program product includes program code for causing a computing device to receive a live stream comprising results for the plurality of events. The computer program product includes program code for causing a computing device to determine a result of the selected event in a virtual sporting contest based on a result of the user selected event.

Particular embodiments of the present invention are directed to systems, methods and computer program products for providing a fantasy sports game that shares the same objective as an actual sporting contest and that is played in real-time during the actual sporting contest.

In one particular embodiment, a method for providing on a client device in communication with a network a fantasy sports game that shares the same objective as an actual sporting contest and that is played in real-time during the actual sporting contest comprises displaying, on the client device, an indication of an option to start the game. The method further includes receiving an input, to the client device, indicating to start the game. The method further includes displaying, on the client device, a first list including a plurality of players intended to participate in a first actual event to occur in the actual sporting contest. The method further includes receiving an input, to the client device, indicating a first selection of at least one of the players from the first list. The method further includes receiving, at the client device from the network, real-time data from the actual sporting contest, wherein the real-time data includes a first actual result for the first actual event. The method further includes displaying, on the client device, an indication of the first actual result. The method further includes determining a virtual result in the game based on the first actual result.

In one particular embodiment, a client device for providing a fantasy sports game that shares the same objective as an actual sporting contest and that is played in real-time during the actual sporting contest comprises a processor, a memory coupled to the processor, and a network coupled to the processor. The processor is configured to display, on the client device, an option to start the game. The processor is further configured to receive an input indicating to start the game. The processor is further configured to display, on the client device, a first list including a plurality of players intended to participate in a first actual event to occur in the actual sporting contest. The processor is further configured to receive an input indicating a first selection of at least one of the players from the first list. The processor is further configured to receive, from the network, real-time data from the actual sporting contest, wherein the real-time data includes a first actual result for the first actual event. The processor is further configured to display, on the client device, an indication of the first actual result. The processor is further configured to determine a virtual result in the game based on the first actual result.

In one particular embodiment, a non-transitory computer program product providing a fantasy sports game that shares the same objective as an actual sporting contest and that is played in real-time during the actual sporting contest comprises a computer readable medium storing computer readable program code embodied in the medium. The non-transitory computer program product comprises program code for causing a client device to display an option to start the game. The non-transitory computer program product further comprises program code for causing the client device to receive an input indicating to start the game. The non-transitory computer program product further comprises program code for causing the client device to display a first list including a plurality of players intended to participate in a first actual event to occur in the actual sporting contest. The non-transitory computer program product further comprises program code for causing the client device to receive an input indicating a first selection of at least one of the players from the first list. The non-transitory computer program product further comprises program code for causing the client device to receive, from a network, real-time data from the actual sporting contest, wherein the real-time data includes a first actual result for the first actual event. The non-transitory computer program product further comprises program code for causing the client device to display an indication of the first actual result. The non-transitory computer program product further comprises program code for causing the client device to determine a virtual result in the game based on the first actual result.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 2 is a block diagram of a client device in accordance with exemplary embodiments of the present invention.

FIG. 3 is a block diagram of a server device in accordance with exemplary embodiments of the present invention.

FIG. 8 is an entity relationship diagram of users, challenges and devices in accordance with exemplary embodiments of the present invention.

FIG. 9 is an entity relationship diagram of real game or actual sporting contest data in accordance with exemplary embodiments of the present invention.

FIG. 10 is an entity relationship diagram of challenge/game infrastructure in accordance with exemplary embodiments of the present invention.

DETAILED DESCRIPTION

With respect to the present invention, a "sporting contest" is a competitive activity that is governed by a set of rules or customs. Exemplary sporting contests include, for example, baseball, soccer, hockey, American football and golf. An "actual sporting contest" is a sporting contest that takes place in reality. Exemplary actual sporting contests include, for example, a single baseball game or a single round of golf. An "event" is an occurrence that happens within a sporting contest. Exemplary events include, for example, an at-bat in baseball, a play in American football, or a shot in basketball. A "virtual sporting contest" is a sporting contest that is created by users selecting events chosen from an actual sporting contest. A "fantasy sports contest" is a game where participants act as owners to build a team that competes against other fantasy owners based on the statistics generated by the real individual players or teams of a professional sport. A "same objective fantasy sports game" or a "game" is a game that allows users to create virtual sporting contests to be played solo, head to head or with a group.

With respect to the present invention, a sporting contest can be broken down into a series of events. For example, in the case of baseball, the sporting contest can be broken down into a series of at-bats. For American football, the sporting contest can be broken down by each individual play. For golf, the sporting contest can be broken down into individual holes or strokes. For other sporting contests, the contest can be broken down by a set period of time. In certain embodiments of the present invention, the events from multiple unrelated, actual sporting contests are used to create a virtual sporting contest. The virtual sporting contest created by the user will have the same objective and follow the scoring rules of the actual sporting contest it is replicating.

Figure 11:
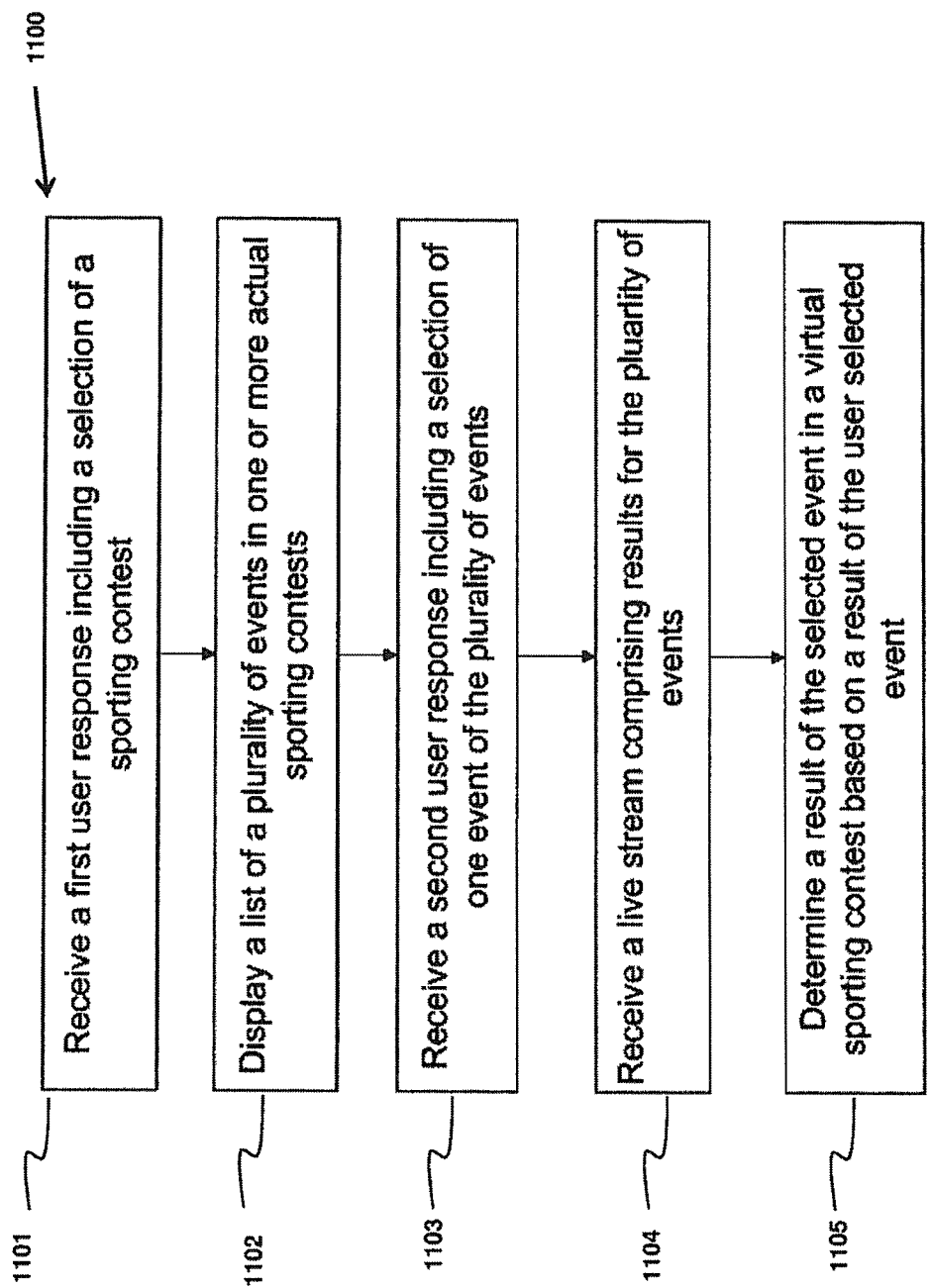
FIG. 11 is a flow diagram illustrating steps of a method for an objective fantasy sports game in accordance with exemplary embodiments of the present invention.

Referring now to FIG. 11, a flow diagram illustrating the steps of a method for an objective fantasy sports game in accordance with exemplary embodiments of the present invention is provided. In an embodiment of the present invention, method 1100 includes receiving a first user response including a selection of a sporting contest (step 1101). For example, a user can select baseball, soccer, hockey, American football or golf. In certain embodiments of the present invention, a user can select to play the game in real time or using past actual sporting contests and events. If the game is to be played in real time the user will only be able to select a sporting contest where live data streams from actual sporting contests are available. If the user wishes to play a game using past actual sporting contests and events, the present invention allows them to manually select a date when actual sporting contests were being played.

Next, in method 1100, the API displays a list of a plurality of events in one or more actual sporting contests (step 1102). The list of events includes events that are about to happen, in the event of a live game, in one or more actual sporting contests. For example, in the case of baseball, the API may display the name of all of the batters that are next up to bat.

Next, in method 1100, a second user response is received that includes a selection of one event from the list of a plurality of events (step 1103). The user will select an event from an actual sporting contest to be used as an event in their game. In certain embodiments of the present invention, the user must select an event prior to the outcome of the event being known.

Next, in method 1100, a real-time stream is received comprising results for the plurality of events (step 1104). Real-time streams via APIs are available from third party vendors. The real-time streams can provide detailed data on the events taking place in actual sporting contests. The streams can also provide detailed data on the events that have already occurred in previous actual sporting contests.

Next, in method 1100, a result of the user selected event is used to determine a result of the selected event in a virtual sporting contest (step 1105). Once the outcome of the users selected event is known, the game will use the outcome in the virtual sporting contest. For example, in baseball, the user selected event may be to select Ryan Zimmerman as their batter. If Ryan Zimmerman hits a home run in the actual sporting contest, then the batter in the virtual sporting contest gets credit for hitting a home run. If in the actual sporting contest there was a runner on first base, Ryan Zimmerman's team would score 2 runs in the actual sporting contest. However, if there were no batters on base in the virtual sporting contest, Ryan Zimmerman's home run would only score 1 run. Likewise, if in the virtual sporting contest the bases were loaded Ryan Zimmerman's home run would score 4 runs.

In one particular embodiment, a virtual sporting contest is created that is made up entirely by compiling the outcome of the users selected events in chronological order. The virtual sporting contest ends at a predetermined number of innings, periods, or length of time. In the case of Major League Baseball, the virtual sporting contest ends after 27 outs have been recorded, unless extra innings are required. In the case of golf, the virtual sporting contest ends after 18 holes have been completed. Other sporting contests may end when a certain amount of time expires.

In certain aspects of the present invention, the game may be played as a solo game, head to head or part of a group challenge. The history and event details of the virtual sporting contest created by the user may be stored on a core database server, and users may be able to keep track of the past virtual sporting contests and compete in leagues or tournaments.

Figure 1:
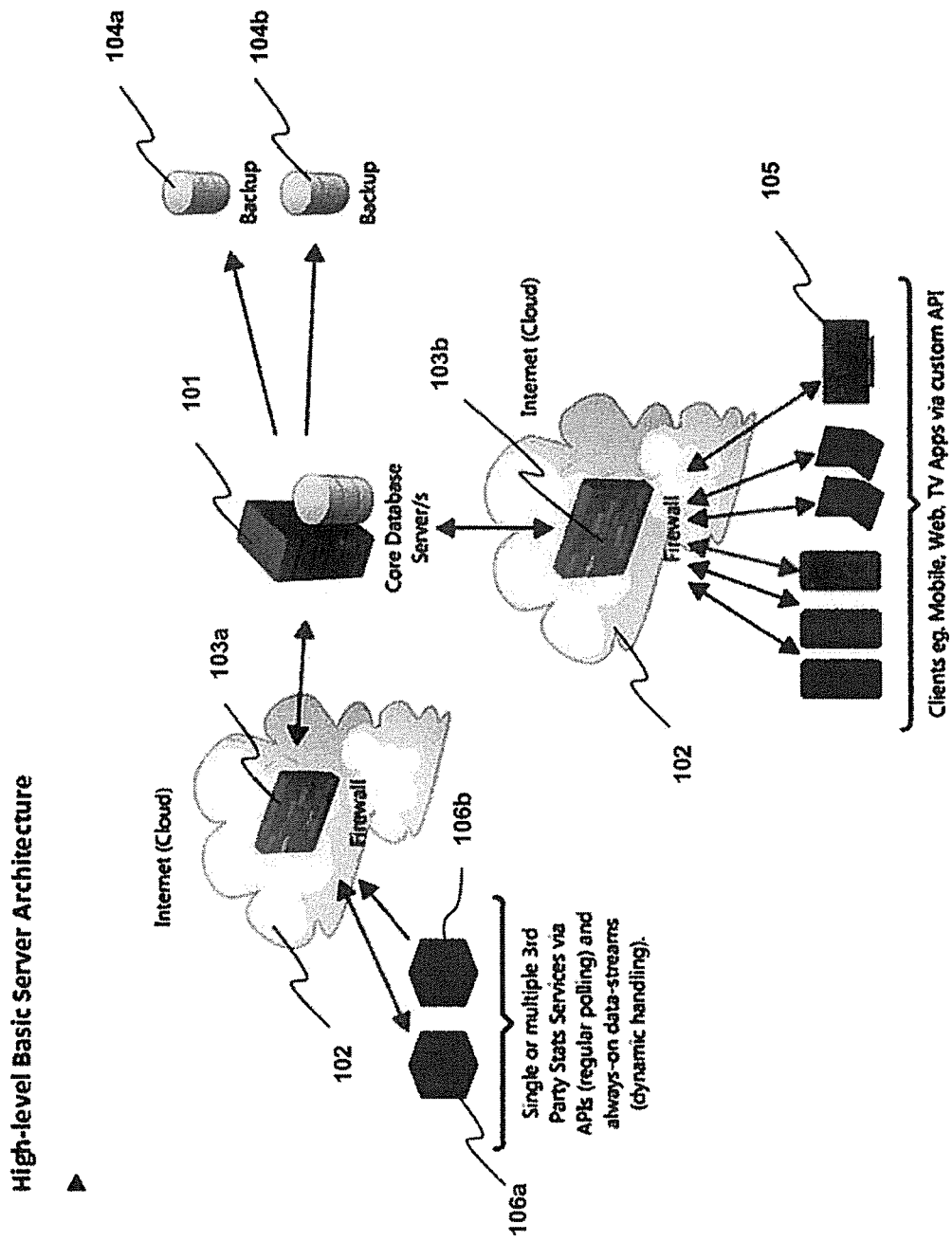
FIG. 1 illustrates an exemplary architecture of a communication system in accordance with exemplary embodiments of the present invention.

Referring now to FIG. 1, an exemplary architecture of a communication system in accordance with exemplary embodiments of the present invention is illustrated. System 100 includes at least one core database server that is coupled with an electronic data network 102 (e.g., the Internet-Cloud). The core database server 101 can be configured to communicate with one or more third party statistics services 106a, 106b. The core database server 101 can communicate with the single or multiple third party statistics services 106a, 106b via APIs (regular polling) and/or always-on data-streams (dynamic handling). The core database server 101 may communicate with one or more third party statistics services 106a, 106b through a firewall 103a.

The core database server can be configured to communicate with one or more client user devices 105. The core database server 101 may communicate with one or more client user devices 105 through a firewall 103b. Non-limiting examples of client user devices 105 include a computer, a tablet, a television, and a mobile device. The client user device 105 can be configured to execute the program without being configured to a network. Alternatively, the client user interface 105 can be configured to access the computer program product via the electronic data network 102. In certain embodiments, a custom API can be installed on a client user device that allows a user to play a game by creating a virtual sporting contest. The client user device 105 can be configured to communicate with one or more core database servers 101 via an electronic network 102. The one or more core database servers 101 may be coupled with the electronic data network via a TCP/IP connection via, for example, an Internet Service Provider (ISP).

Core database servers 101 are configured to generate, maintain, and host the computer program product. In one embodiment, the servers 101 generate, maintain and host web pages (e.g., HTML documents) that embody the present invention. The severs 101 include a provision of services associated with the rendering of dynamic web pages, such as data storage services, security services, etc. Accordingly, servers 101 can include a conventional hardware arrangement and be outfitted with software and/or firmware for performing web server functions for performing aspects of the present invention, such as, for example, javascript/jquery, HTML5, CSS2/3, and facilities for SSL, MySQL, PHP, and SOAP, etc.

Servers 101 may be coupled with a data storage facility, including backup local or remote memory units 104a, 104b, and can include one or more databases and/or file systems for storing data, graphics, HTML documents, XML documents, etc.

Servers 101 can be configured to include an Admin function, which enables an administrator to perform system related functions. The system related functions can include maintaining user records, performing upgrades, etc.

Referring to FIG. 2, a block diagram of a device 200, such as for example, a client user device 105 including but not limited to a computer, a tablet, a television or a mobile device, in accordance with exemplary embodiments of the present invention is illustrated. As shown in FIG. 2, the device 200 may include a processor 205, which may include one or more microprocessors and/or one or more circuits, such as an application specific integrated circuit (ASIC), Field-programmable gate arrays (FPGAs), etc.

The device 200 may include a network interface 225. The network interface 225 is configured to enable communication with a communication network, using a wired and/or wireless connection.

The device 200 may include memory 220, which may include one or more non-volatile storage devices and/or one or more volatile storage devices (e.g., random access memory (RAM)). In instances where the device 200 includes a microprocessor, computer readable program code may be stored in a computer readable medium, such as, but not limited to magnetic media (e.g., a hard disk), optical media (e.g., a DVD), memory devices (e.g., random access memory), etc. In some embodiments, computer readable program code is configured such that when executed by a processor, the code causes the device to perform the steps described below. In other embodiments, the device is configured to perform steps described below without the need for code.

The device 200 may include an input device 210. The input device is configured to receive an input from either a user or a hardware or software component. Examples of an input device 210 include a keyboard, mouse, microphone, touch screen and software enabling interaction with a touch screen, etc. The device may also include an output device 215. Examples of output devices 215 include monitors, televisions, mobile device screens, tablet screens, speakers, etc. The output device 215 can be configured to display images or video or play audio to a user. One or more of the input and output devices can be combined into a single device.

Referring now to FIG. 3, a block diagram of a server in accordance with exemplary embodiments of the present invention is illustrated. As shown in FIG. 3, the server 300 may include a network interface 315 for transmitting and receiving data, a processor 305 for controlling operation of the server device 300, and a memory 310 for storing computer readable instructions (i.e., software) and data. The network interface 315 and memory 310 are coupled to and communicate with the processor 305, which controls their operation and the flow of data between them.

Processor 305 may include one or more microprocessors and/or one or more circuits, such as an application specific integrated circuit (ASIC), Field-programmable gate arrays (FPGAs), etc. Network interface 325 can be configured to enable communication with a communication network, using a wired and/or wireless connection. Memory 310 may include one or more non-volatile storage devices and/or one or more volatile storage devices (e.g., random access memory (RAM)). In instances where server system 300 includes a microprocessor, computer readable program code may be stored in a computer readable medium, such as, but not limited to magnetic media (e.g., a hard disk), optical media (e.g., a DVD), memory devices (e.g., random access memory), etc. In some embodiments, computer readable program code is configured such that when executed by a processor, the code causes the device to perform the steps described below. In other embodiments, the device is configured to perform steps described below without the need for code.

Server 300 can be configured to include an Admin function, which enables an administrator to perform system related functions. The system related functions can include maintaining user records, performing upgrades, moderation of tasks, etc.

Figure 4A:
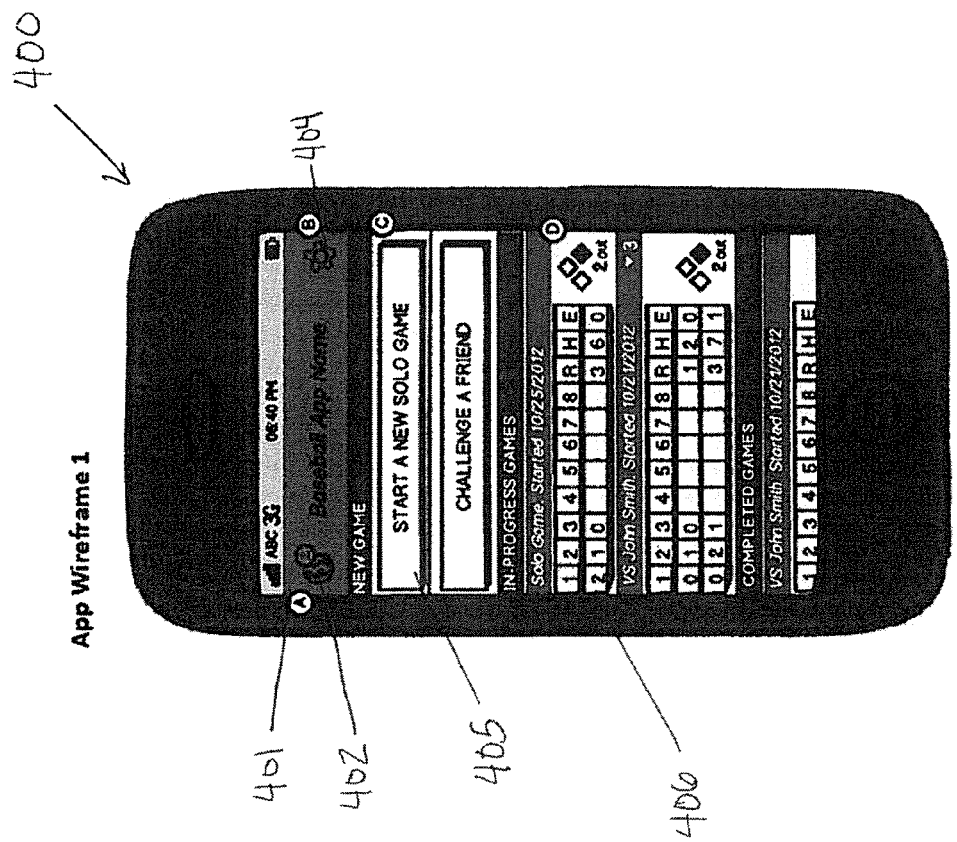
FIG. 4a is an image of an exemplary screen of a home page in accordance with exemplary embodiments of the present invention.
Figure 4B:
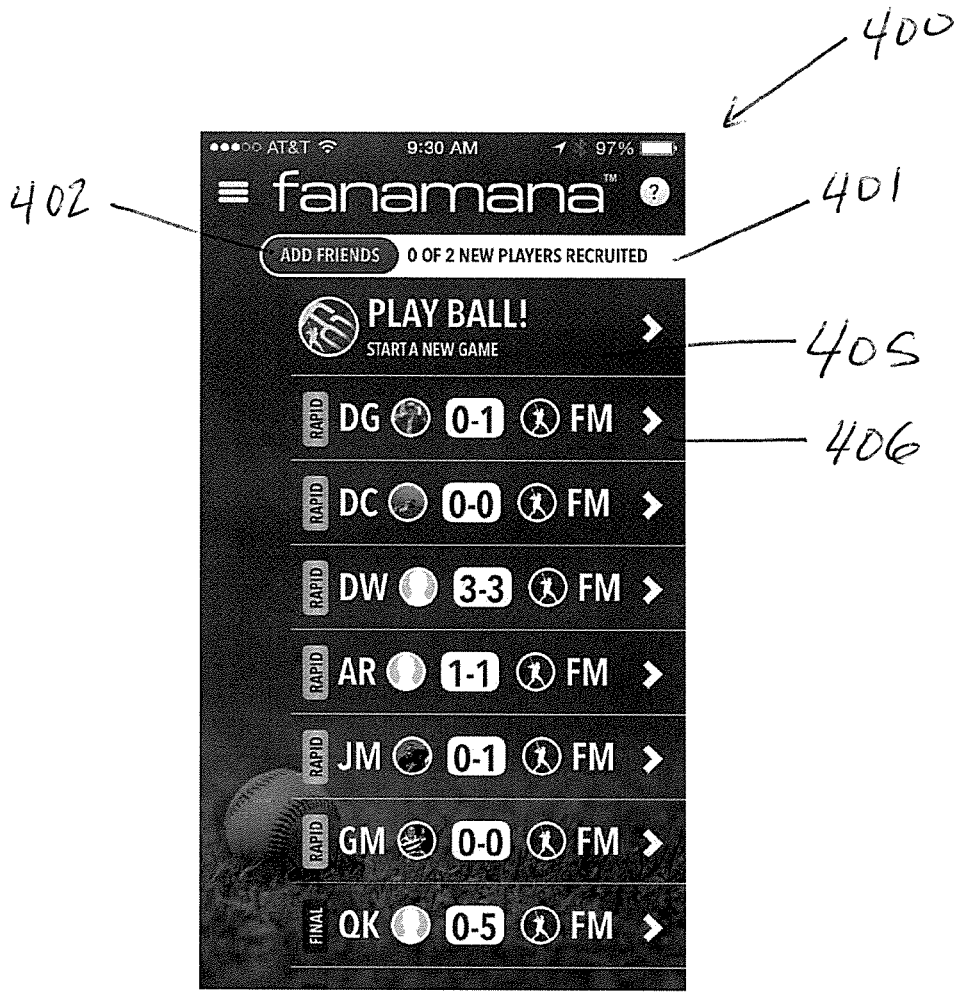
FIG. 4b is an image of an exemplary screen of a home page in accordance with exemplary embodiments of the present invention.

Now referring to FIG. 4a and FIG. 4b, an image of an exemplary screen of a home page in accordance with exemplary embodiments of the present invention is provided. The home screen 400 contains a header 401 with a notification button 402. The notification button 402 contains a badge number 403 representing the number of new notifications received by a user that have not yet been seen. Examples of notifications include challenges from friends to play a new game or alerts that a new friend has started to play a game.

In an exemplary embodiment, the header 401 includes a settings button 404. The settings button 404 allows a user to control privacy settings and connections to social media applications, e.g., Facebook.

In an exemplary embodiment, the home page screen 400 includes a button allowing a user to start a new virtual game 405. In embodiments of the present invention, a user can select to start a solo-game or a head-to-head game. The head-to-head game can be against a friend, for example a Facebook or Twitter friend, or a random opponent. In certain embodiments of the present invention, a user will connect to Facebook before starting a game against a friend. A user will then be allowed to begin a game against a friend as identified on Facebook. After starting a new virtual game, in certain embodiments of the present invention, a user is provided with the rules of the game before entering the game view. The rules of the game can include, for example, information about whether the game is a live only game or whether a game is related to a previous date.

In certain embodiments of the present invention, the home page screen 400 also includes a listing of in progress and past games for a user 406. The in progress and past games can be listed with box scores for the virtual games. In an exemplary embodiment, a user is permitted to click on an in progress or past game. Upon clicking on the game, in the event of an in progress game, the game is opened for the user to play. In the event of a past game, the full details and results of the game are opened for the user to review.

Figure 5A:
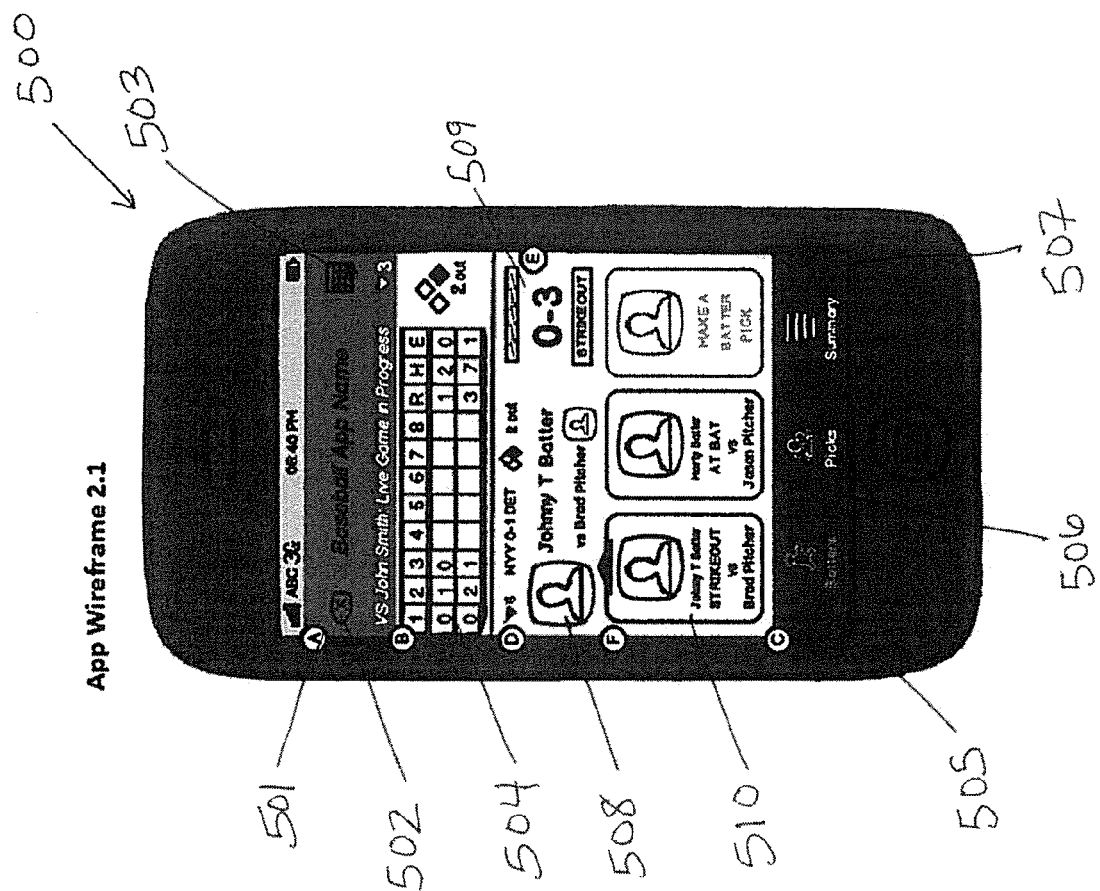
FIG. 5a is an image of an exemplary screen of a batters game screen in accordance with exemplary embodiments of the present invention.
Figure 5B:
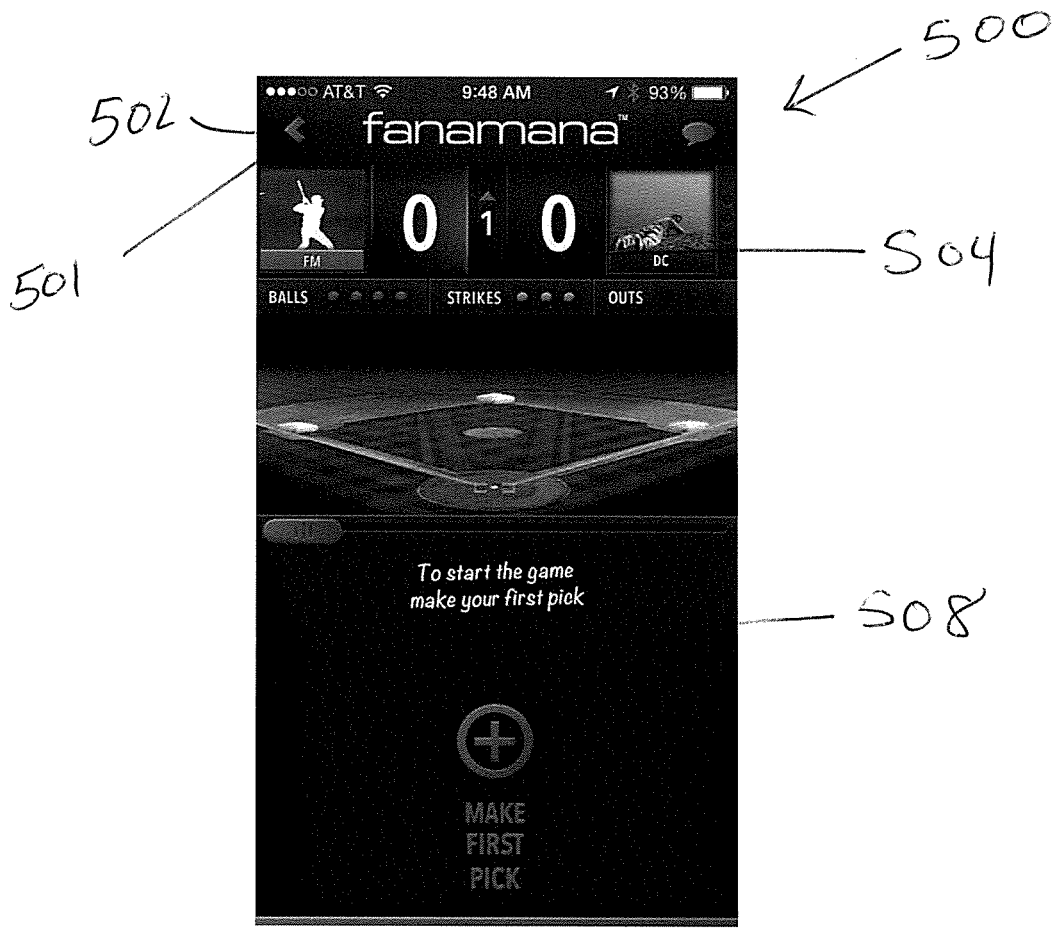
FIG. 5b is an image of an exemplary screen of a batters game screen in accordance with exemplary embodiments of the present invention.

Now referring to FIG. 5a and FIG. 5b, an image of an exemplary screen of a batters game screen 500 in accordance with exemplary embodiments of the present invention is provided. In certain embodiments of the present invention, a header is provided. In the header 501, there is a back button 502 that allows a user to return to the home screen if selected. A calendar 503 may appear on the right of the header if the selected game is a prior date game that allows for emulation of games from past dates. In certain embodiments of the present invention, the back button will also show a badge number. As described with respect to the home screen page, the badge number represent the number of new notifications a user has not yet seen.

In certain embodiments, the batters game screen 500 includes the full score and game status details 504. The full score can be depicted in a box score format. The full score and game status details stays consistent throughout the different tabs within the game.

The batters game tab 505 is the first of three standard tabs for an exemplary embodiment on a mobile device. The batters tab is the first of three tabs located on the bottom of the page in an exemplary embodiment. In an exemplary embodiment, the picks tab 506 is the second tab, which changes the screen to enable new batters to be picked. In an exemplary embodiment, the summary tab 507 displays an overview of each batters at-bat activity.

In an exemplary embodiment of the present invention, the upper central area of the batters game screen shows the currently selected player at-bat 508. The area shows the batter's and pitcher's name. In certain embodiments, an image of the batter and/or pitcher may be provided. The score and status of the game that the selected batter is participating in may also be provided.

On the right side of an exemplary embodiment of a batters game screen is a live-update of the pitches 509. In certain embodiments, a pitch track can be displayed that provides an exemplary strike zone with the location of each pitch to the selected batter. The result of each pitch (e.g., balls, strikes, and outs) will update in real time.

In the lower area of an exemplary embodiment of a batters game screen is a display of all currently chosen batters 510. By default, the first batter is selected. For empty spaces, grayed out or placeholder buttons will indicate to a user that another batter can be selected. A user can select the grayed out button, which will result in the same functionality as if the picks tab 506 was selected.

Figure 6A:
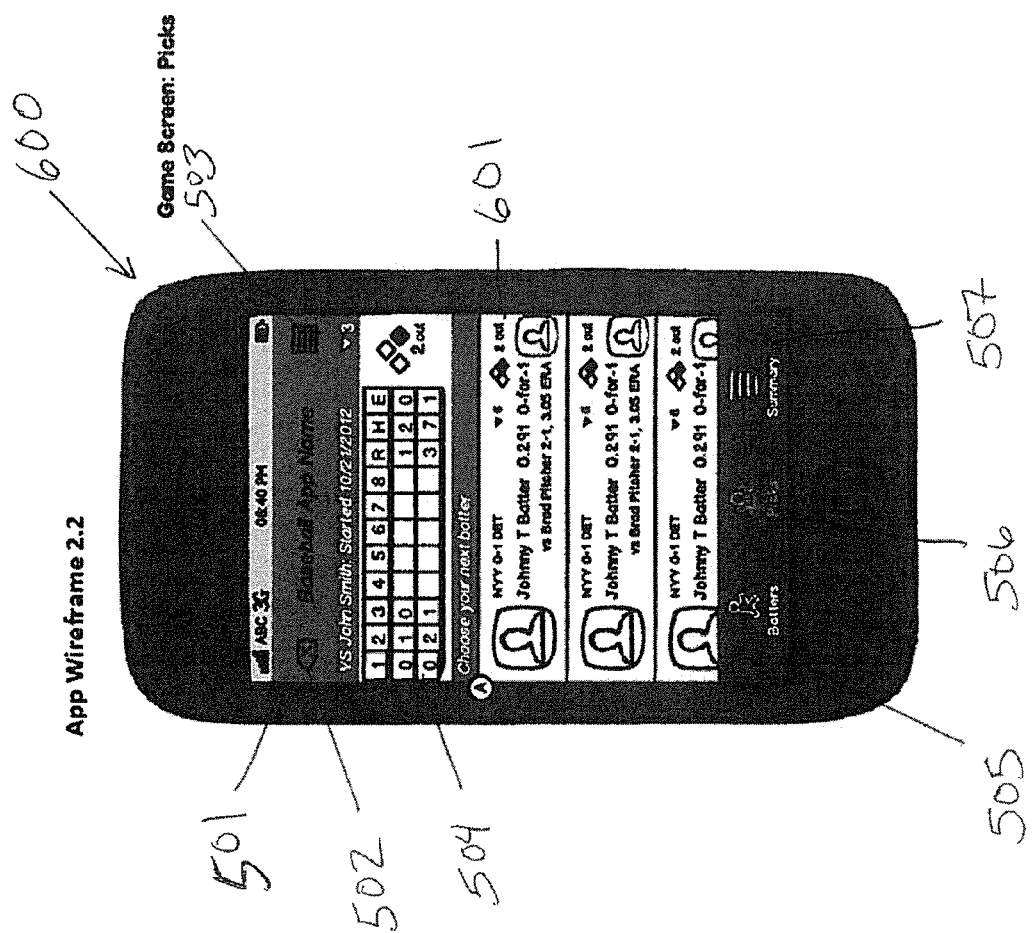
FIG. 6a is an image of an exemplary screen of a pick game screen in accordance with exemplary embodiments of the present invention.
Figure 6B:
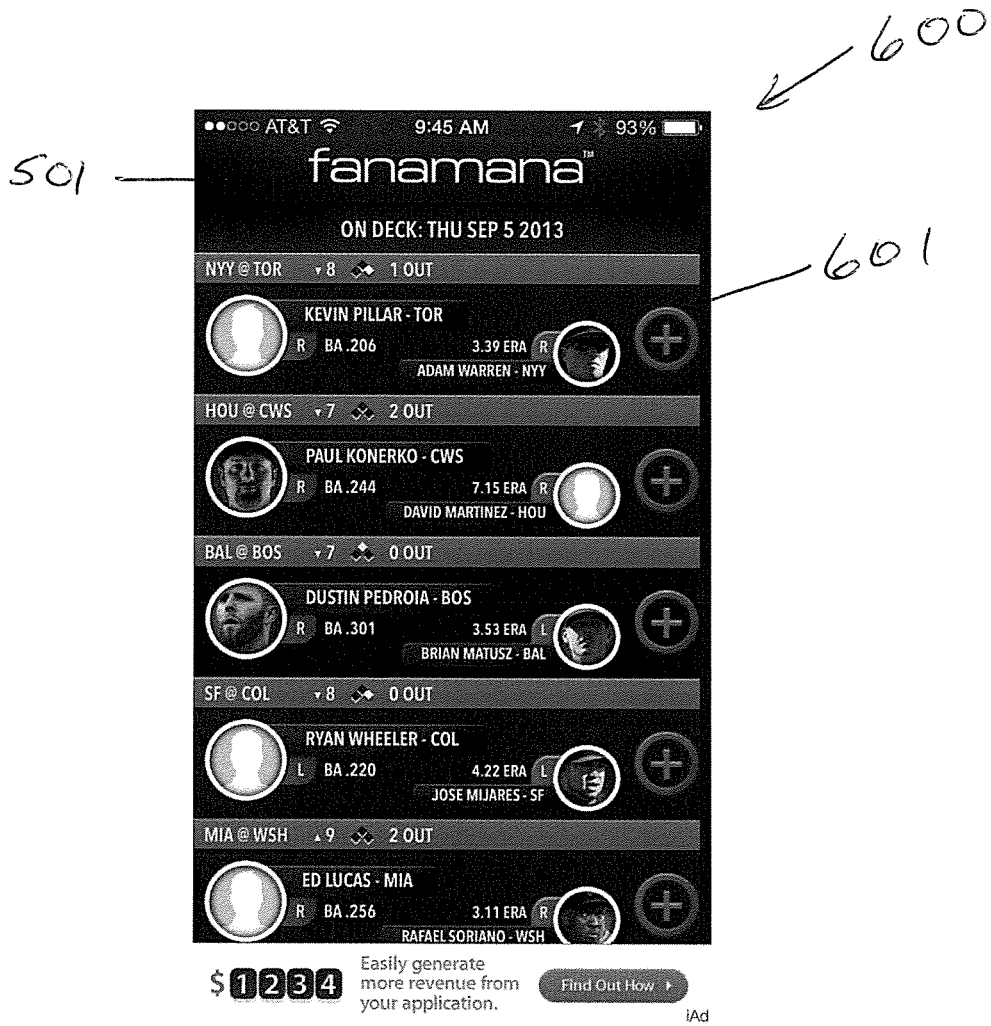
FIG. 6b is an image of an exemplary screen of a pick game screen in accordance with exemplary embodiments of the present invention.

Now referring to FIG. 6a and FIG. 6b, an image of an exemplary screen of a picks game screen is displayed. As described in greater detail above, the full score and game status details can be provided for the picks tab.

In certain embodiments of the present invention, the picks game screen is largely similar to the batters game screen. In the exemplary embodiment, one difference is the main central area is replaced with a list of currently available players that are projected to bat next in current real world games 601. The list may mostly comprise players that are "on-deck" in real world games. The list can also display the first player due up in the first inning of a game that has yet to be played. Furthermore, the list may include a player that is currently at-bat, but who has yet to be thrown a pitch in the real world game.

Figure 7A:
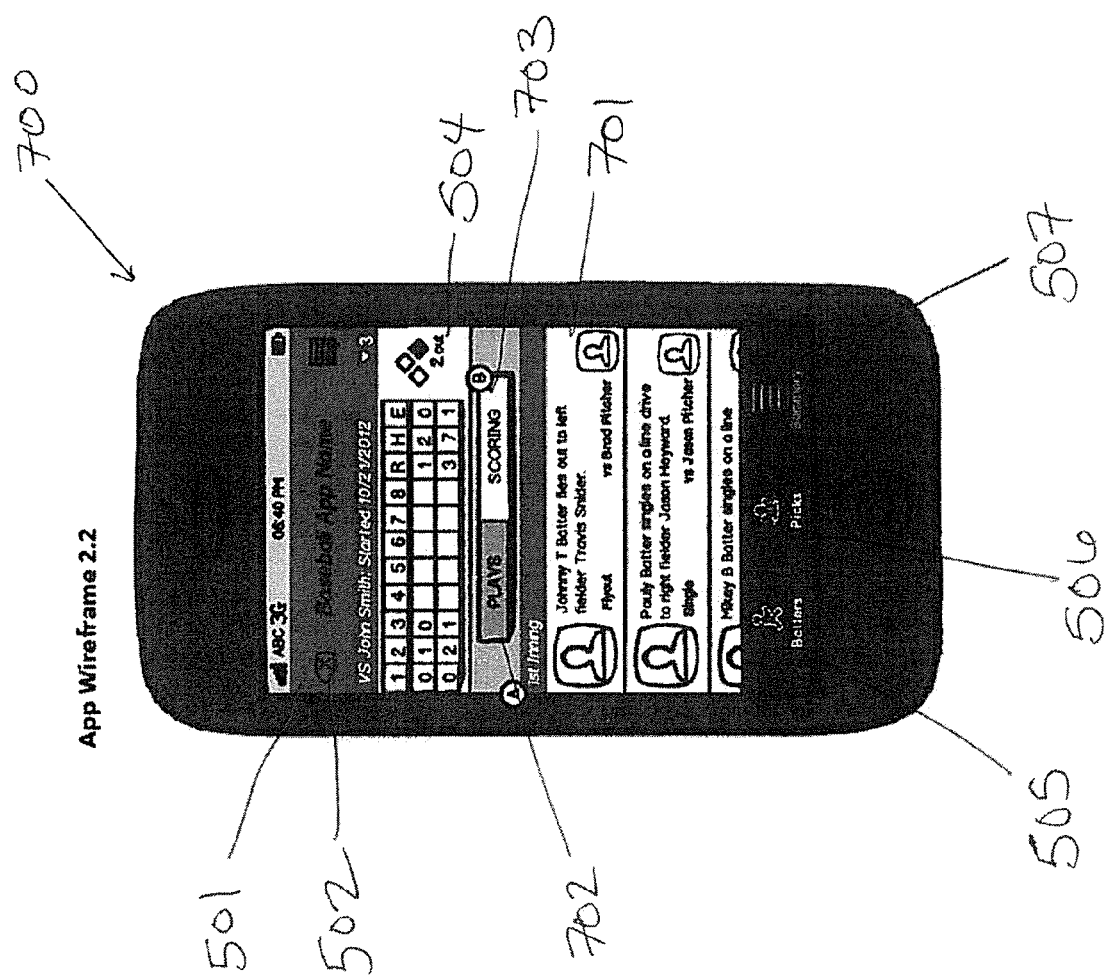
FIG. 7a is an image of an exemplary screen of summary game screen in accordance with exemplary embodiments of the present invention.
Figure 7B:
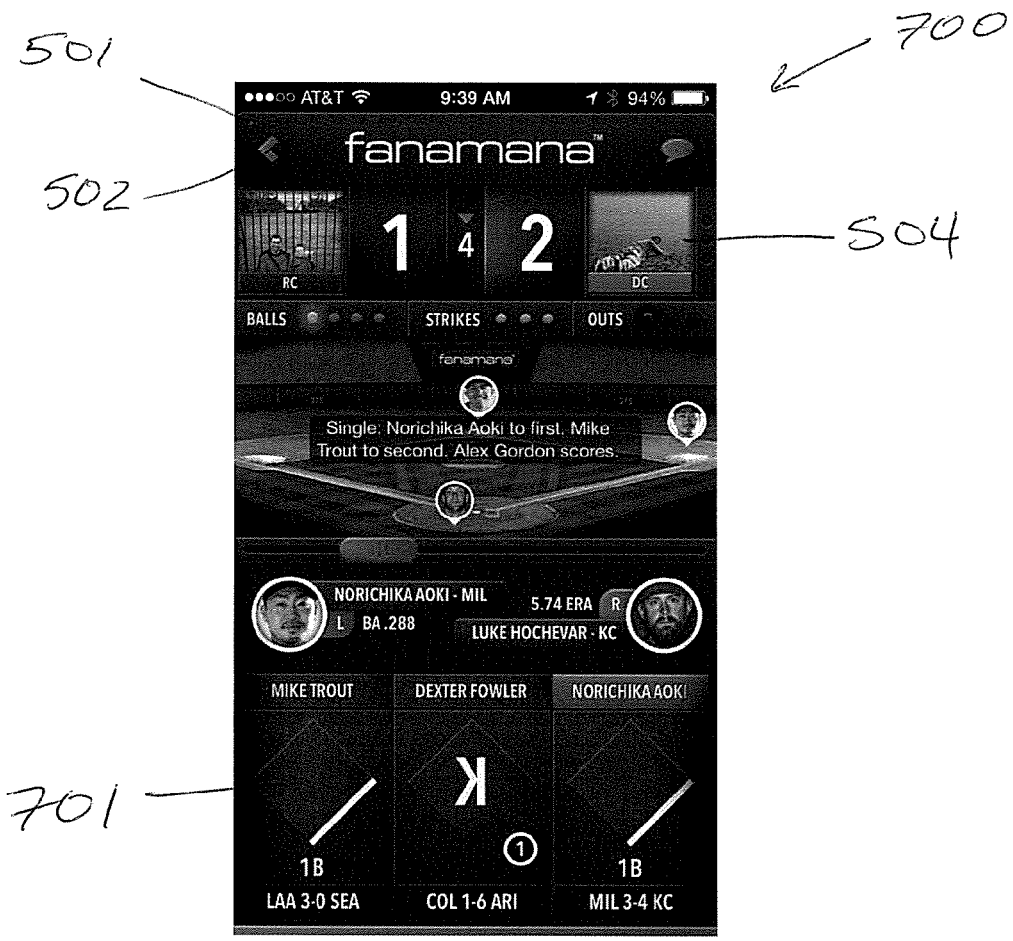
FIG. 7b is an image of an exemplary screen of summary game screen in accordance with exemplary embodiments of the present invention.

Now referring to FIG. 7a and FIG. 7b, an image of an exemplary screen of the summary game screen in accordance with exemplary embodiments of the present invention is provided. As described in greater detail above, the full score and game status details can be provided for the picks tab.

In certain embodiments of the present invention, the picks game screen is largely similar to the batters game screen. In the exemplary embodiment, one difference is the main central area includes a list of each batter's activity 701. The list indicates the result of at-bat batters' activities in real world games and the result of batters' activities in the virtual game. The summary game screen can also include the scores and effects on the virtual game of players currently on base.

In certain embodiments of the present invention, filters can affect the displayed list. For example, a 'plays filter' 702 can display all plays to a user. Additionally, a 'scoring filter' 703 can display only scoring plays to a user.

Now referring to FIG. 8, an image of an entity relationship diagram 800 of users, challenges and devices in accordance with exemplary embodiments of the present invention is provided. Entity relationship diagram 800 shows the database tables and relationships for user information, attached accounts and interface devices. Entity relationship diagram 800 also includes session history, friends' relationships along with head-to-head challenges and virtual sporting contests (top level). FIG. 8 illustrates the relationship between an accounts database 801, friends database 802, users database 803, challenges database 804, vgames database 805, sessions database 806, notifications database 807 and devices database 808.

Accounts database 801 stores information related to third party accounts (i.e., Facebook, Twitter, etc.) to users. Friends database 802 may store relationships between users and allow for challenging people the user may know. Users database 803 may store information relating to a player entity (i.e., a user of the present invention). Challenges database 804 may store information relating to the top-level game challenge that contains related virtual sporting contests. Vgames database 805 may store the home or away team's game activity that is related to the player entity. Sessions database 806 may store records of each individual login session to authenticate and track all interactions. Notifications database 807 may store records of important game related actions that are pushed to or pulled by the player entity. Devices database 808 may store player entity client device notification settings. For example, devices database 808 may store iPhone, Android, or television device settings including push notification settings. These exemplary databases may be connected in various configurations. FIG. 8 identifies one such exemplary configuration of the described databases.

Now referring to FIG. 9, an image of an entity relationship diagram 900 of real game or actual sporting contest data in accordance with exemplary embodiments of the present invention is provided. Entity relationship diagram 900 shows the database tables and relationships for actual sporting contests (e.g., baseball games). The game details, team information and player statistics are used for a virtual sporting contest in making player selections and showing actual events and details of actual sporting contests. FIG. 9 illustrates the relationship between an rgames database 901, teams database 902, player stats database 903, players database 904, and events database 905.

Rgames database 901 stores information related to actual sporting contests (including past actual sporting contest results). The information may include the schedule, results, and statistics for all actual sporting contests available. Teams database 902 may store information including the city, team name and information belonging to actual sporting contest teams. For example, a teams database may store information including information about all professional baseball teams. Players database 903 may store information relating to all players for the actual sporting contest teams in teams database 902. For example, a players database may store information for all baseball players for all professional baseball teams. Player stats database 904 may store information relating to the actual sporting event statistics for all players stored in players database 903. For example, player stats database may include the batting statistics (e.g., hits, runs batted in, home runs, etc.) and pitching statistics (e.g., strikeouts, walks, earned run average) for all baseball players. Events database 905 may store the real-time and past event results for each team, which are used for determining a result in a virtual sporting contest. For example, the events database may store the result of each at bat in each inning in all real-time and previously played baseball games.

Now referring to FIG. 10, an image of an entity relationship diagram 1000 of the challenge/game infrastructure in accordance with exemplary embodiments of the present invention is provided. Entity relationship diagram 1000 shows the database tables and relationships for all data required to handle virtual sporting contests between two users. Entity relationship diagram 1000 also illustrates the relationship between real games ("Rgames") and virtual games ("Challenges>VGames"). Exemplary entity relationship diagram 1000 is for a baseball game. FIG. 10 illustrates the relationship between a challenges database 1001, vgames database 1002, vinnings database 1003, diamonds database 1004, events database 1005, event status database 1006 and picks database 1007.

Challenges database 1001 may store information related to the top-level game challenge that includes related virtual sporting contests for each user. Vgames database 1002 stores the home and/or away team's virtual sporting contest activity related to the user. Vinnings database 1003 may store the history of scores and statuses for each inning for each user's team. Diamonds database 1004 may store the status of the field at the start of each user pick or selection. For example, the diamonds database may store the location (i.e., first base, second base, third base, home plate) of each base runner in a virtual sporting contest. Events database 1005 may store real time and past events for actual sporting contests, which are used to determine the result in a virtual sporting contest. For example, the events database may store the at-bat results for each team in each inning of all actual baseball games. Event status database 1006 may store the reference data used to determine the result of each event. For example, the event status database accounts may store information necessary to determine the result of an event in an actual sporting contest on the virtual sporting contest. In certain embodiments, the event status database may determine the number of bases that a runner advances when a certain result happens in an actual sporting contest. The event status database may also determine the number of runs scored by a user in a virtual sporting contest based on the results in an actual sporting contest. Picks database 1007 may store information related to the event selected by a user.

Figure 12:
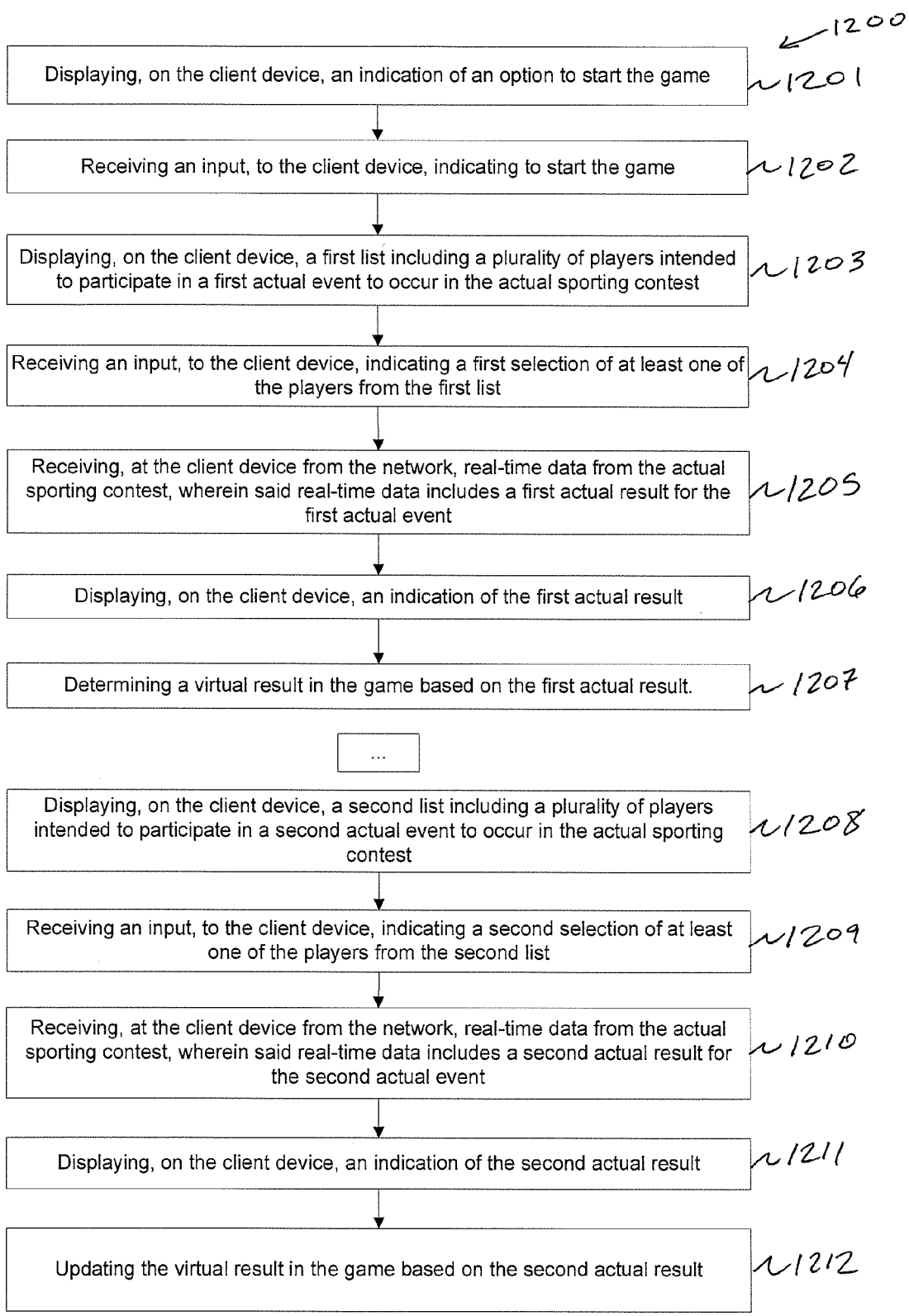
FIG. 12 is a flow diagram illustrating steps of a method for providing on a client device in communication with a network a fantasy sports game that shares the same objective as an actual sporting contest and that is played in real-time during the actual sporting contest in accordance with exemplary embodiments of the present invention.

Referring now to FIG. 12, a flow diagram illustrating the steps of a method 1200 for providing on a client device in communication with a network a fantasy sports game that shares the same objective as an actual sporting contest and that is played in real-time during the actual sporting contest is provided.

Method 1200 includes displaying, on the client device, an indication of an option to start the game (step 1201). The indication to start a game can include a "start game" button or hyperlink. The indication to start a game can present a user of the client device with the option to start a new game or to start a game that is in progress.

Method 1200 further includes receiving an input, to the client device, indicating to start the game (step 1202). The input can be received via an input device such as a touch screen, a mouse, or a microphone. The input can be the selection of a button or hyperlink.

Method 1200 further includes displaying, on the client device, a first list including a plurality of players intended to participate in a first actual event to occur in the actual sporting contest (step 1203). The list can include buttons or hyperlinks that can be selected by a user. The list can be a list of players from any sport, such as baseball, football, basketball, hockey or golf. The list of players can include a list of players intended to participate in a first actual event. In certain embodiments, the list is a list of baseball players that are intended to have an at bat in an actual, real-life baseball game. The list can include baseball players that are currently on deck in all active or live baseball games. The list can further include one or more selected from: an image of the player, a team name of the player, at least one statistic of the player, the team name of the opposing team in the actual sporting contest, and the score of the actual sporting contest. In certain embodiments, the list includes a list of baseball players on deck in currently live games, an identification of the current baseball game that the player is participating in, an identification of the inning of the baseball game, an identification of the base runner status and outs in the baseball game, a batting average of the player, the opposing team's projected pitcher for the at bat, and the projected pitcher's earned run average.

Method 1200 further includes receiving an input, to the client device, indicating a first selection of at least one of the players from the first list (step 1204). The input of step 1204 can be received in the same manner as in step 1202.

Method 1200 further includes receiving, at the client device from the network, real-time data from the actual sporting contest, wherein the real-time data includes a first actual result for the first actual event (step 1205). In certain embodiments, real-time data is received including the result of each at bat in all currently active or live baseball games. The real-time data can include the result of the at bat of the selected baseball player in certain embodiments.

Method 1200 further includes displaying, on the client device, an indication of the first actual result (step 1206). The display can include an image or a graphic identifying the result. For example, wherein the actual sporting contest is baseball and the actual event is an at bat, the display can be a baseball scorecard abbreviation for a strikeout (e.g., K), a flyball (i.e., FB), or a single (i.e., 1 B). The display can also be a simulation of the event in graphical form.

Method 1200 further includes determining a virtual result in the game based on the first actual result (step 1207). In certain embodiments where the actual sporting contest is baseball, the virtual result can be an out, a single, a double, a triple or a homerun. The virtual result can also be a run for the user. For example, if a virtual result is a homerun, then the virtual result can be to score a run for the user.

Method 1200 can further include optional steps 1208-1212. Method 1200 can include displaying, on the client device, a second list including a plurality of players intended to participate in a second actual event to occur in the actual sporting contest (step 1208). The second list can be similar to the first list from step 1203, but can provide a different list of players based on the time that the list is generated. For example, wherein the actual sporting contest is baseball, the second list can be a more recent list of players that are on deck in active or live baseball games.

Method 1200 can further include receiving an input, to the client device, indicating a second selection of at least one of the players from the second list (step 1209). The input for step 1209 can be similar to the input received as described in step 1204. The second selected player can be on a different sport team than the first selected player.

Method 1200 can further include receiving, at the client device from the network, real-time data from the actual sporting contest, wherein the real-time data includes a second actual result for the second actual event (step 1210). In certain embodiments, real-time data is received including the result of each at bat in all currently active or live baseball games. The real-time data can include the result of the at bat of the selected baseball player in certain embodiments.

Method 1200 can further include displaying, on the client device, an indication of the second actual result (step 1211). The indication of step 1211 can be similar to the indication of step 1206.

Method 1200 can further include updating the virtual result in the game based on the second actual result (step 1212). In certain embodiments where the actual sporting contest is baseball, the virtual result can be an out, a single, a double, a triple or a homerun. The virtual result can also be affected by previous virtual results. For example, if a previous virtual result was a triple, and the current virtual result is a single, then the virtual result can be to score a run for the user. As another example, if two previous virtual results were outs, and the current virtual result is an out, the current virtual result can result in ending the half inning of the game.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

We claim:

1. A method for providing on a client device in communication with a network a fantasy sports game that shares the same objective as an actual sporting contest and that is played in real-time during a plurality of actual sporting contests comprising:
   displaying, on the client device, an indication of an option to start the game;
   receiving an input, to the client device, indicating to start the game;
   displaying, on the client device, a first list including a plurality of players intended to participate in a first actual event to occur in the plurality of actual sporting contests;
   receiving an input, to the client device, indicating a first selection of at least one of the players from the first list;
   receiving, at the client device from the network, real-time data from the plurality of actual sporting contests, wherein said real-time data includes a first actual result for the first actual event;
   displaying, on the client device, an indication of the first actual result; and
   determining a first virtual result in the game based on the first actual result, wherein the first virtual result contributes to the objective of the fantasy sports game, which is the same as the objective of the actual sporting contest.

2. The method of claim 1, further comprising:
   displaying, on the client device, a second list including a plurality of players intended to participate in a second actual event to occur in the plurality of actual sporting contests;
   receiving an input, to the client device, indicating a second selection of at least one of the players from the second list;
   receiving, at the client device from the network, real-time data from the plurality of actual sporting contests, wherein said real-time data includes a second actual result for the second actual event;
   displaying, on the client device, an indication of the second actual result; and
   updating the first virtual result in the game based on the first virtual result and the second actual result.

3. The method of claim 2, further comprising:
   displaying, on the client device, the first virtual result.

4. The method of claim 1, wherein the list further comprises one or more of an image of the player, a team name of the player, at least one statistic of the player, the team name of the opposing team in the actual sporting content, and the score of the actual sporting contest.

5. The method of claim 2, wherein the second selected at least one player is participating in a different actual sporting contest than the first selected at least one player.

6. The method of claim 3, wherein the actual sporting contest is baseball.

7. The method of claim 6, wherein the first actual event is an at bat to occur in a baseball game.

8. The method of claim 7, wherein the determination of the first virtual result is displayed in the form of a baseball scorecard abbreviation.

9. The method of claim 7, wherein the at bat is a next projected at bat to occur in the baseball game.

10. The method of claim 7, wherein the updating the first virtual result comprises updating an on base status of the first selected at least one player based on the second actual result.

11. The method of claim 7, wherein the determining the first virtual result comprises updating the runs scored in the game based on the second actual result.

12. The method of claim 11, wherein the determining the first virtual result comprises ending a half inning of the game after a third out occurs based on the second actual result.

13. The method of claim 6, wherein the game ends after a predetermined number of innings.

14. The method of claim 13, wherein the game ends after nine innings.

15. A client device for providing a fantasy sports game that shares the same objective as an actual sporting contest and that is played in real-time during a plurality of actual sporting contests comprising:
   a processor;
   a memory coupled to the processor; and
   a network coupled to the processor,
   wherein the processor is configured to:
   display, on the client device, an option to start the game;
   receive an input indicating to start the game;
   display, on the client device, a first list including a plurality of players intended to participate in a first actual event to occur in the plurality of actual sporting contests;
   receive an input indicating a first selection of at least one of the players from the first list;
   receive, from the network, real-time data from the plurality of actual sporting contests, wherein said real-time data includes a first actual result for the first actual event;
   display, on the client device, an indication of the first actual result; and
   determine a first virtual result in the game based on the first actual result, wherein the first virtual result contributes to the objective of the fantasy sports game, which is the same as the objective of the actual sporting contest.

16. The client device of claim 15, wherein the processor is further configured to:
   display, on the client device, a second list including a plurality of players intended to participate in a second actual event to occur in the plurality of actual sporting contests;
   receive an input indicating a second selection of at least one of the players from the second list;

receive, from the network, real-time data from the plurality of actual sporting contests, wherein said real-time data includes a second actual result for the second actual event;

display, on the client device, an indication of the second actual result; and update the first virtual result in the game based on the first virtual result and the second actual result.

17. The client device of claim 16, wherein the processor is further configured to:

display, on the client device, the first virtual result.

18. A non-transitory computer program product providing a fantasy sports game that shares the same objective as an actual sporting contest and that is played in real-time during a plurality of actual sporting contests, said non-transitory computer program product comprising a computer readable medium storing computer readable program code embodied in the medium, said non-transitory computer program product comprising:

program code for causing a client device to display an option to start the game;

program code for causing the client device to receive an input indicating to start the game;

program code for causing the client device to display a first list including a plurality of players intended to participate in a first actual event to occur in the plurality of actual sporting contests;

program code for causing the client device to receive an input indicating a first selection of at least one of the players from the first list;

program code for causing the client device to receive, from a network, real-time data from the plurality of actual sporting contests, wherein said real-time data includes a first actual result for the first actual event;

program code for causing the client device to display an indication of the first actual result; and program code for causing the client device to determine a first virtual result in the game based on the first actual result, wherein the first virtual result contributes to the objective of the fantasy sports game, which is the same as the objective of the actual sporting contest.

19. The non-transitory computer program product of claim 18, further comprising:

program code for causing the client device to display a second list including a plurality of players intended to participate in a second actual event to occur in the plurality of actual sporting contests;

program code for causing the client device to receive an input indicating a second selection of at least one of the actual players from the second list;

program code for causing the client device to receive, from the network, real-time data from the plurality of actual sporting contests, wherein said real-time data includes a second actual result for the second actual event;

program code for causing the client device to display an indication of the second actual result; and program code for causing the client device to update the first virtual result in the game based on the first virtual result and the second actual result.

20. The non-transitory computer program product of claim 19, further comprising:

program code for causing the client device to display the first virtual result.

* * * * *